United States Patent
Uematsu

(10) Patent No.: US 9,740,197 B2
(45) Date of Patent: Aug. 22, 2017

(54) MOTOR CONTROL APPARATUS GENERATING COMMAND LIMITED BY MOTOR TORQUE

(71) Applicant: FANUC CORPORATION, Yamanashi (JP)

(72) Inventor: Hidetoshi Uematsu, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 14 days.

(21) Appl. No.: 14/932,380

(22) Filed: Nov. 4, 2015

(65) Prior Publication Data
US 2016/0132041 A1 May 12, 2016

(30) Foreign Application Priority Data
Nov. 7, 2014 (JP) .................. 2014-226965

(51) Int. Cl.
G05B 19/18 (2006.01)
G05B 19/416 (2006.01)
G05B 19/19 (2006.01)
G05B 19/408 (2006.01)

(52) U.S. Cl.
CPC ........... G05B 19/416 (2013.01); G05B 19/19 (2013.01); G05B 19/408 (2013.01); G05B 2219/43045 (2013.01)

(58) Field of Classification Search
CPC .... G05B 19/408; G05B 19/416; G05B 19/19; G05B 2219/43194; G05B 19/231
USPC .......................................................... 318/569
See application file for complete search history.

(56) References Cited

U.S. PATENT DOCUMENTS

2002/0045957 A1* 4/2002 Otsuki ................. G05B 19/416
700/63
2011/0316191 A1 12/2011 DiSimone

FOREIGN PATENT DOCUMENTS

JP 3681972 B2 8/2005
JP 2009098786 A * 5/2009
JP 2014051201 A * 3/2014

OTHER PUBLICATIONS

English Abstract for Japanese Publication No. 3681972 B2, published Aug. 10, 2005, 2 pgs.

(Continued)

Primary Examiner — Kawing Chan
Assistant Examiner — Bradley Brown
(74) Attorney, Agent, or Firm — Fredrikson & Byron, P.A.

(57) ABSTRACT

A motor control apparatus includes a detection unit detecting a motor rotational frequency, a storage unit storing an allowable torque at the motor rotational frequency detected by detection unit, a first torque offset generated in a direction opposite to a moving direction of a movable body, a second torque offset generated in one direction regardless of the moving direction of the movable body, a rotor inertia moment, a load inertia moment, and a conversion factor for converting a motor rotation angle in rotary motion of the motor to a moving distance in linear motion of the movable body, and an acceleration calculation unit calculating an acceleration command of the motor for each moving direction of the movable body and each acceleration operation and deceleration operation using the allowable torque, the first torque offset, the second torque offset, the rotor inertia moment, the load inertia moment, and the conversion factor.

5 Claims, 9 Drawing Sheets

(56) References Cited

OTHER PUBLICATIONS

Matsubara, A., "Control Engineering for Accurate Positioning and Feed Shaft Design," Japan, Morikita Publishing Co., Ltd. pp. 98-102.
English Abstract and Machine Translation for Japanese Publication No. 2014-051201 A, published Mar. 20, 2014, 29 pgs.
English Abstract and Machine Translation for Japanese Publication No. 2009-098786 A, published May 7, 2009, 16 pgs.

* cited by examiner

| MOTOR ROTATIONAL FREQUENCY N | ALLOWABLE TORQUE $T_{ML}(N)$ OF MOTOR |
|---|---|
| 0rpm | 14Nm |
| 400rpm | 29Nm |
| 2200rpm | 29Nm |
| 3600rpm | 20Nm |
| 4000rpm | 14Nm |

SPEED COMMAND BEFORE MOVING AVERAGE

ROTATIONAL FREQUENCY

PRIOR ART

FIG. 12A

| SPEED | ACCELERATION |
|---|---|
| 0m/sec | 3m/sec$^2$ |
| 0.13m/sec | 10m/sec$^2$ |
| 0.73m/sec | 10m/sec$^2$ |
| 1.23m/sec | 6m/sec$^2$ |
| 1.33m/sec | 3m/sec$^2$ |

PRIOR ART

FIG. 12B

| SPEED | ACCELERATION |
|---|---|
| 0m/sec | 3m/sec$^2$ |
| 0.27m/sec | 15.3m/sec$^2$ |
| 0.77m/sec | 15.3m/sec$^2$ |
| 1.17m/sec | 12m/sec$^2$ |
| 1.33m/sec | 3m/sec$^2$ |

SPEED-ACCELERATION

TORQUE

MOTOR CONTROL APPARATUS GENERATING COMMAND LIMITED BY MOTOR TORQUE

BACKGROUND OF THE INVENTION

1. Field of the Invention

The present invention relates to a motor control apparatus which controls a motor connected to a movable body as a driving source to linearly move the movable body.

2. Description of the Related Art

In a structure which moves a movable body by connecting to a motor, a servo control loop is constituted in which a motor control apparatus generates a position command or a speed command with respect to a rotor of the motor to control the motor, and information about a rotor position and a rotor speed of the motor obtained from an encoder attached to the motor is fed back to the motor control apparatus. The above-described structure includes, for example, a structure in which a motor is connected to a ball screw by a coupling and a table as a movable body is attached to a nut of the ball screw.

In the above-described servo control loop, when a stepwise speed command is given, acceleration at a start of the command will be infinity, and a torque exceeds an allowable torque which is a maximum torque that the motor can output. In addition, rapid acceleration and deceleration gives a large impact to the movable body and causes deterioration in positioning accuracy. Thus, acceleration is limited by acceleration and deceleration processing in an actual command. As described in Atsushi Matsubara, 2008, "Control Engineering For Accurate Positioning and Feed Shaft Design", pp 98 to 102, Japan, Morikita Publishing Co., Ltd, there are, for example, moving average-type acceleration and deceleration (linear acceleration and deceleration) and two-stage moving average-type acceleration and deceleration (referred to as S-shaped acceleration and deceleration or bell-shaped acceleration and deceleration) as typical acceleration and deceleration processing.

For example, in the moving average-type acceleration and deceleration processing, an arithmetic operation expressed by a formula 1 is executed with respect to an input speed command $f_{in}(\tau)$. In the formula 1, a moving average time (primary acceleration and deceleration time) is given as $\tau_1$, and a speed command after the moving average-type acceleration and deceleration processing is given as $f_{out}(\tau)$.

$$f_{out}(t) = \frac{1}{\tau_1} \int_{t-\tau_1}^{t} f_{in}(\tau) d\tau \quad (1)$$

However, in the moving average-type acceleration and deceleration processing based on the formula 1, when an acceleration response sufficiently and immediately follows an acceleration command, the acceleration response is generated stepwise which increases an impact on the movable body connected to the motor. In order to avoid generation of the stepwise acceleration response, the two-stage moving average-type acceleration and deceleration is often used. In the two-stage moving average-type acceleration and deceleration processing, an arithmetic operation expressed by a formula 2 is executed with respect to an input speed command $f_{in}(\tau)$. In the formula 2, a first stage moving average time (primary acceleration and deceleration time) is given as $\tau_1$, a second stage moving average time (secondary acceleration and deceleration time) is given as $\tau_2$, and a speed command after the two-stage moving average-type acceleration and deceleration processing is given as $f_{out}(\tau)$. In addition, a relationship of $\tau_1 > \tau_2$ is satisfied.

$$f_{out}(t) = \frac{1}{\tau_1 \tau_2} \int_{t-\tau_2}^{t} \int_{t-\tau_1}^{t} f_{in}(\tau) d\tau^2 \quad (2)$$

Simulated waveforms of the two-stage moving average-type acceleration and deceleration processing based on the formula 2 are illustrated in FIG. 5 to FIG. 11. The present simulation uses a model in which a motor is connected to a ball screw by a coupling and a table as a movable body is attached to a nut of the ball screw. A case is considered in which the table is moved to a rising direction (i.e., a direction against the gravity) while assuming that a deceleration distance D of the table as the movable body is 0.4 [m], and a maximum speed $V_L$ of the table is 1.33 [m/sec] (=4000 [rpm]/60 [sec/min]*0.02 [m/rev]). In the following descriptions, the deceleration distance D means a deceleration distance when deceleration is started from a current position, and thus, a position obtained by adding the deceleration distance D to the current position is a position of the movable body after deceleration. Usually, the deceleration distance D and the sum of the deceleration distance D and the current position (i.e., the position of the movable body after deceleration) are momentarily calculated, and when the calculated position of the movable body after deceleration reaches a target position, deceleration is started. Further, it is assumed that a maximum rotational frequency $N_L$ of the motor is 4000 [rpm], a lead of the ball screw is 0.020 [m/rev], and a rotation-to-linear conversion factor R for converting a motor rotation angle in rotary motion of the motor to a moving distance in linear motion of the movable body is 0.00318 [m/rad] (=0.02/2π). The first stage moving average time $\tau_1$ is 160 [msec], and the second stage moving average time $\tau_2$ is given as 80 [msec] in the two-stage moving average-type acceleration and deceleration processing. A rotor inertia moment $J_m$ of the motor is given as 0.00179 [kgm²]. An inertia moment $J_m$ of the movable body which is expressed as a total of inertia moments of the table, the ball screw, and the coupling is given as 0.00537 [kgm²]. A friction torque of the movable body linearly moved by the motor is given as 2 [Nm]. A torque for holding gravity received by the movable body (hereinbelow, referred to as "gravity holding torque") is given as 4 [Nm].

FIG. 5 illustrates a speed command before executing the two-stage moving average-type acceleration and deceleration processing. In FIG. 5, the speed command $f_{in}(\tau)$ is expressed as a motor rotational frequency. When a stepwise speed command $f_{in}(\tau)$ is given to stop the table moving in the maximum speed $V_L$ (i.e., the motor rotates at the maximum rotational frequency $N_L$) at a position of the deceleration distance D=0.4 [m], it takes 300 [msec] to stop as expressed in a formula 3 if the two-stage moving average-type acceleration and deceleration processing is not executed.

$$0.4 \text{ [m]} \div (0.02/2\pi) \div 4000 \text{ [rpm]} \div (60/2\pi) = 300 \text{ [msec]} \quad (3)$$

On the other hand, FIG. 6 illustrates a speed command when the two-stage moving average-type acceleration and deceleration processing is executed with respect to the speed command illustrated in FIG. 5. In FIG. 6, a speed command $f_{out}(\tau)$ is expressed as a motor rotational frequency. When the two-stage moving average-type acceleration and deceleration processing is executed to the speed command $f_{in}(\tau)$ in FIG. 5, the speed command $f_{out}(\tau)$ is obtained as illustrated in FIG. 6. FIG. 7 illustrates acceleration of the movable body when the speed command after the two-stage moving average-type acceleration and deceleration processing in FIG. 6 is given, and FIG. 8 illustrates an acceleration change in the acceleration of the movable body in FIG. 7. FIG. 9 illustrates a position of the movable body when the speed command after the two-stage moving average-type acceleration and deceleration processing in FIG. 6 is given. As illustrated in FIG. 9, it takes 540 [msec] to stop the movable body at the position of the deceleration distance D=0.4 [m], and a time length for positioning is longer compared to 300 [msec] when the two-stage moving average-type acceleration and deceleration processing is not executed (FIG. 5).

FIG. 10 illustrates a generation torque when the speed command after the two-stage moving average-type acceleration and deceleration processing in FIG. 6 is given. FIG. 11 illustrates a relationship between rotational frequency and torque when the speed command after the two-stage moving average-type acceleration and deceleration processing in FIG. 6 is given. In FIG. 11, a broken line indicates an allowable torque which is the maximum torque that the motor can output, and a solid line indicates a generation torque when the speed command after the two-stage moving average-type acceleration and deceleration processing is given. As illustrated in FIG. 11, the first stage moving average time $\tau_1$ and the second stage moving average time $\tau_2$ are set so that a torque of an acceleration end side falls within the allowable torque and is close to the allowable torque as much as possible. The generation torque of an acceleration start side and the generation torque of the acceleration end side are symmetrical, and they will be also symmetrical in a speed-acceleration graph in the acceleration start time and in the acceleration end time, which is not illustrated here. The allowable torque of the motor largely decreases when the motor rotational frequency is high, so that the generation torque of the acceleration start side has a margin with respect to the allowable torque of the motor. As described above, the first stage moving average time $\tau_1$ and the second stage moving average time $\tau_2$ are set in a manner such that the generation torque of the acceleration end side falls within the allowable torque of the motor, and thus the torque generated during deceleration has a value sufficiently smaller than the allowable torque.

As described above, the two-stage moving average-type acceleration and deceleration processing based on the formula 2 has an advantage of avoiding an impact on the movable body connected to the motor which may be generated in the moving average-type acceleration and deceleration processing based on the formula 1. However, the two-stage moving average-type acceleration and deceleration processing based on the formula 2 is limited by an acceleration and deceleration performance in a high-speed range of the motor, and thus, sufficient acceleration matching with the performance cannot be performed in a low-speed range of the motor. In other words, a fairly large part of the acceleration performance is not utilized in the low-speed range, which causes a disadvantage that an extra time is required for positioning and acceleration and deceleration before and after the positioning.

In contrast, as described in, for example, Japanese Patent No. 3681972, an acceleration and deceleration control method has been proposed in which an acceleration pattern constituted of a point sequence of (speed, acceleration) is set according to an output torque of the motor with respect to four torque waveforms for a moving direction of an axis (motor rotational direction) in acceleration and deceleration. According to the method, a relationship between motor speed and acceleration is set without making the torque of the acceleration start side and the torque of the acceleration end side symmetrical, so that the generation torque of the acceleration start side can be close to the allowable torque, and the acceleration performance in the low-speed range can be efficiently used.

Simulated waveforms when the invention described in Japanese Patent No. 3681972 is applied to the above-described model in which the motor is connected to the ball screw by the coupling and the table as the movable body is attached to the nut of the ball screw are described with reference to FIG. 12A, FIG. 12B and FIG. 13 to FIG. 16. Parameters used for the simulation are the same as those in the simulation described with reference to FIG. 5 to FIG. 11. FIG. 12A is a diagram indicating a relationship between speed and acceleration during acceleration used for the simulation in the invention described in Japanese Patent No. 3681972. FIG. 12B is a diagram indicating a relationship between speed and acceleration during deceleration used for the simulation in the invention described in Japanese Patent No. 3681972. FIG. 13 is a graph illustrating the relationships between speed and acceleration in FIG. 12A and FIG. 12B. In the present simulation, the relationships between speed and acceleration during acceleration and deceleration when the movable body is moved to a plus direction by the motor are set as illustrated in FIG. 12A, FIG. 12B, and FIG. 13, and the speed is linearly interpolated therebetween.

As illustrated in FIG. 12A, FIG. 12B, and FIG. 13, a speed V(t) when the movable body is accelerated at set acceleration A(t) is expressed as a formula 4. A calculation period is given as Δt in the formula 4.

$$V(t)=V(t-1)+A(t)\times\Delta t \quad (4)$$

A maximum speed of the movable body is given as $V_c$. In a motor control apparatus 1, the deceleration distance D required to decelerate from the maximum speed $V_c$ is calculated, and when the movable body reaches a position separated the deceleration distance D from a target stop position, the movable body is decelerated at the acceleration A(t) set as illustrated in FIG. 12A, FIG. 12B, and FIG. 13 and stopped when the speed V(t)=0 is satisfied.

FIG. 14 illustrates a generation torque when the movable body is moved while maintaining the relationship between speed and acceleration in FIG. 12A, FIG. 12B, and FIG. 13. FIG. 15 illustrates a position of the movable body when the movable body is moved while maintaining the relationship between speed and acceleration in FIG. 12A, FIG. 12B, and FIG. 13. As illustrated in FIG. 15, it takes 430 [msec] to stop the movable body at the position of the deceleration distance D=0.4 [m], and the time length for positioning is shorter compared to 540 [msec] when the two-stage moving average-type acceleration and deceleration processing is executed (FIG. 9). FIG. 16 illustrates a relationship between rotational frequency and torque when the movable body is moved while maintaining the relationship between speed and acceleration in FIG. 12A, FIG. 12B, and FIG. 13. As illustrated in FIG. 16, an inclination of the torque of the acceleration end side can be changed in two steps according to the allowable torque of the motor and an acceleration change (jerk) allowed to the movable body (machine), and the torque of the acceleration start side can has an inclination according to the allowable jerk, so that a sufficient torque can be output with respect to a torque that the motor can output. Curves of the torque during acceleration and the torque during deceleration can be matched with each other excepting the beginning and the end which are separated by the allowable jerk, so that a sufficient torque can be output with respect to the torque that the motor can output.

According to the moving average-type acceleration and deceleration processing, when the acceleration response sufficiently and immediately follows the acceleration command, the acceleration is generated stepwise, and there is a problem that an impact on the movable body connected to the motor becomes larger.

According to the two-stage moving average-type acceleration and deceleration, the acceleration performance is not utilized in the low-speed range, and there is a problem that an extra time is required for positioning and acceleration and deceleration before and after the positioning.

According to the invention described in Japanese Patent No. 3681972, the relationship between motor speed and acceleration is set without making the torque of the acceleration start side and the torque of the acceleration end side symmetrical, so that the generation torque of the acceleration start side can be close to the allowable torque, and there is an advantage that the acceleration performance in the low-speed range can be efficiently used. However, acceleration and deceleration patterns need to be set 12 points or more (=3 points or more*4 patterns) for each motion considering that the allowable torque of the motor decreases to the high-speed range, and there is a problem that setting operations are complicated. For example, when the movable body is a shaft which receives a frictional force and gravity, the setting operations will be more complicated depending on a specification of a machine to which the motor control apparatus is applied.

SUMMARY OF THE INVENTION

An object of the present invention is the provision of a motor control apparatus capable of bringing a torque generated in a motor in various operation states close to an allowable torque with less parameter adjustment and efficiently using a motor performance in view of the above-described problems.

In order to realize the above-described object, a motor control apparatus controlling a motor connected to a movable body as a driving source to linearly move the movable body includes a detection unit configured to detect a motor rotational frequency, a storage unit configured to store an allowable torque which is a maximum torque that the motor can output at the motor rotational frequency detected by the detection unit, a first torque offset which is a torque generated in a direction opposite to a moving direction of the movable body, a second torque offset which is a torque generated in one direction regardless of the moving direction of the movable body, a rotor inertia moment of the motor, a load inertia moment, and a conversion factor for converting a motor rotation angle in rotary motion of the motor to a moving distance in linear motion of the movable body, and an acceleration calculation unit configured to calculate an acceleration command of the motor for each moving direction of the movable body and each acceleration operation and deceleration operation of a rotor of the motor using the allowable torque, the first torque offset, the second torque offset, the rotor inertia moment, the load inertia moment, and the conversion factor.

According to the motor control apparatus, when the motor rotational frequency at a time t is given as N(t), the allowable torque is given as $T_{ML}(N(t))$, the first torque offset is given as $T_1$, the second torque offset is given as $T_2$, the rotor inertia moment is given as $J_m$, the load inertia moment is given as $J_L$, and the conversion factor is given as R, the acceleration calculation unit may calculate the acceleration command $A_1(t)$ of the movable body (3) being acceleratedly moved in a first direction based on a following formula, $$A_1(t)=\{T_{ML}(N(t))-T_1-T_2\}\div(J_m+J_L)\times R \quad (5)$$

the acceleration command $A_1(t)$ of the movable body (3) being deceleratedly moved in the first direction based on a following formula, $$A_1(t)=\{-T_{ML}(N(t))-T_1-T_2\}\div(J_m+J_L)\times R \quad (6)$$

the acceleration command $A_1(t)$ of the movable body (3) being acceleratedly moved in a second direction opposite to the first direction based on a following formula, $$A_1(t)=\{T_{ML}(N(t))-T_1+T_2\}\div(J_m+J_L)\times R \quad (7)$$

and the acceleration command $A_1(t)$ of the movable body (3) being deceleratedly moved in the second direction based on a following formula.

$$A_1(t)=\{-T_{ML}(N(t))-T_1+T_2\}\div(J_m+J_L)\times R \quad (8)$$

According to the motor control apparatus, the first torque offset may be a friction torque of the movable body linearly moved by the motor, and the second torque offset may be a gravity holding torque which is a torque for holding gravity received by the movable body.

According to the motor control apparatus, the first torque offset, the second torque offset, and the load inertia moment may be set based on a torque waveform obtained when the movable body is linearly moved by the motor.

According to the motor control apparatus, the allowable torque may be respectively set for acceleration of the movable body and for deceleration of the movable body.

According to the present invention, the motor control apparatus can be realized which can bring a torque generated in the motor in various operation states close to the allowable torque and efficiently use the motor performance. According to the present invention, the torque generated in the motor in various operation states can be easily brought close to the allowable torque by setting the allowable torque, the rotor inertia moment, the first torque offset (the friction torque), the second torque offset (the gravity holding torque), and the load inertia moment, and thus the motor performance can be efficiently used.

BRIEF DESCRIPTION OF THE DRAWINGS

The present invention will be clearly understood with reference to the attached drawings.

FIG. 12A is a diagram indicating the relationship between speed and acceleration during acceleration used for the simulation in the invention described in Japanese Patent No. 3681972.

FIG. 12B is a diagram indicating the relationship between speed and acceleration during deceleration used for the simulation in the invention described in Japanese Patent No. 3681972.

DETAILED DESCRIPTION

The motor control apparatus which generates a command limited by a motor torque will be described below with reference to the drawings. However, it is noted that the present invention is not limited by the drawings and the embodiment described below.

Figures 1, 2:
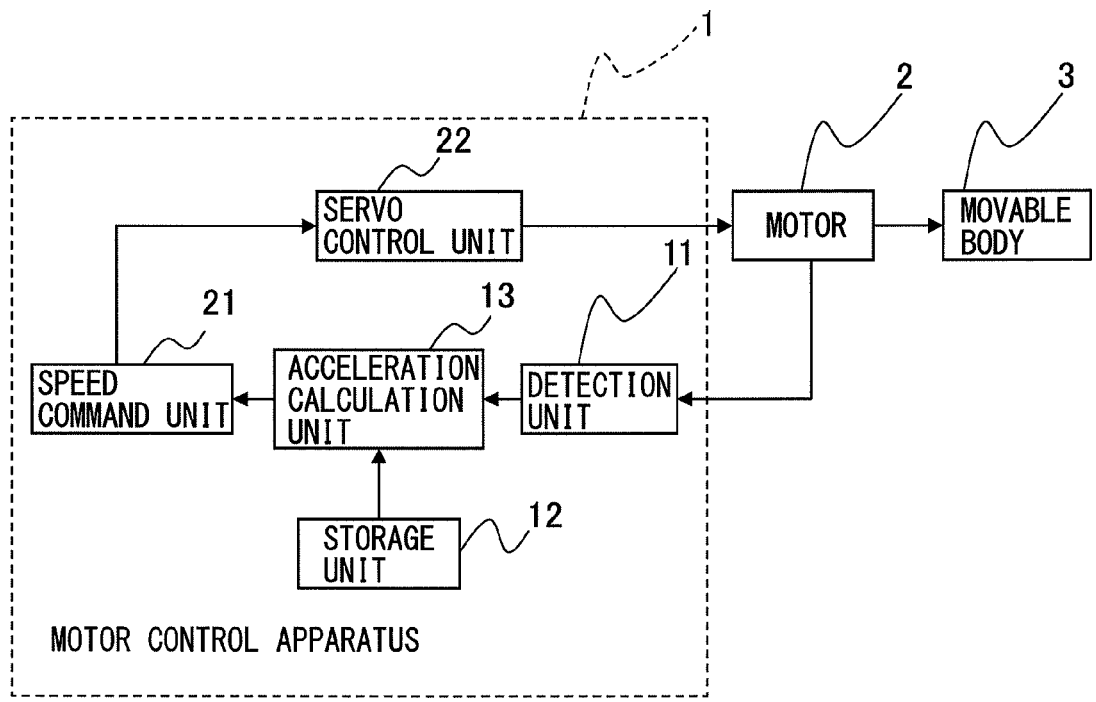
FIG. 1 is a block diagram illustrating a motor control apparatus according to an embodiment.
FIG. 2 is a diagram indicating an allowable torque used for simulation regarding the motor control apparatus according to the embodiment.

FIG. 1 is a block diagram illustrating the motor control apparatus according to the embodiment. A model is described as an example in which a motor 2 is connected to a ball screw by a coupling and a table as a movable body 3 is attached to a nut of the ball screw. According to the present embodiment, the movable body 3, which is a table, linearly moves in a vertical direction, and thus the gravity constantly acts in one direction (i.e., a downward direction) on the movable body 3 linearly moving in the vertical direction. In addition, the model has a mechanical structure in which a frictional force is generated in a direction opposite to the moving direction of the movable body 3 when the movable body 3 linearly moves. According to the present embodiment, as the moving direction of the movable body 3, a direction against the gravity is defined as a first direction (a plus direction), and a direction opposite to the first direction is defined as a second direction (a minus direction).

The motor control apparatus 1 according to the embodiment includes speed command unit 21 and servo control unit 22 as in conventional general motor control apparatus. For a concise description, the servo control unit 22 is described as including a switching element therein and including an inverter (not illustrated) which converts a direct current (DC) supplied from a DC link side to a three-phase alternating current power having a desired voltage and a desired frequency for driving the motor 2 by switching operation of the switching element based on a switching control signal and a switching control unit (not illustrated) which generates the switching control signal. The inverter and the switching control unit do not limit the present invention. For example, the switching control signal may be a PWM (pulse-width modulation) control signal, and the inverter may be configured as a PWM inverter in which the switching elements constitute a three-phase full-bridge inverter. Examples of the switching element include an IGBT (insulated gate bipolar transistor), a thyristor, a GTO (gate turn-off thyristor), a transistor, and so on.

The motor control apparatus 1 according to the embodiment includes a detection unit 11 for detecting the motor rotational frequency, a storage unit 12 for storing various parameters and calculation formulae necessary for acceleration command calculation, and an acceleration calculation unit 13 for calculating the acceleration command of the motor 2.

The detection unit 11 detects a rotational frequency of a rotor of the motor 2 (the motor rotational frequency) based on a signal from a rotary encoder installed near the rotor of the motor 2. The motor rotational frequency is expressed by a function N(t) including time t as an independent variable and has a value equal to or more than zero.

The storage unit 12 stores an allowable torque $T_{ML}(N(t))$ which is the maximum torque that the motor 2 can output when a motor rotational frequency N(t) is detected by the detection unit 11, a first torque offset $T_1$ which is a torque generated in a direction opposite to the moving direction of the movable body 3, a second torque offset $T_2$ which is a torque generated in one direction regardless of the moving direction of the movable body 3, a rotor inertia moment $J_m$ of the motor 2, a load inertia moment $J_L$, and a conversion factor R for converting a motor rotation angle in rotary motion of the motor 2 to a moving distance in linear motion of the movable body. The allowable torque $T_{ML}(N(t))$, the first torque offset $T_1$, and the second torque offset $T_2$ have positive values.

In the parameters stored in the storage unit 12, the allowable torque is expressed as a function including the motor rotational frequency N(t) as an independent variable and specific to the motor 2 driven by the motor control apparatus 1 which is generally specified in advance in the specification of the motor 2 or the like. Similarly, the rotor inertia moment $J_m$ is also specific to the motor 2 driven by the motor control apparatus 1 and is generally specified in advance in the specification of the motor 2 or the like. According to the present embodiment, the allowable torque and the rotor inertia moment $J_m$ are stored in the storage unit 12 in advance.

On the other hand, the first torque offset $T_1$ stored in the storage unit 12 is a torque generated in a direction opposite to the moving direction of the movable body 3 and the friction torque of the movable body 3 linearly moved by the motor 2 according to the present embodiment. The second torque offset $T_2$ stored in the storage unit 12 is the gravity holding torque for holding the gravity received by the movable body 3. The load inertia moment $J_L$ stored in the storage unit 12 is specified by a type of the movable body 3 linearly moved by the motor 2. The first torque offset $T_1$, the second torque offset $T_2$, and the load inertia moment $J_L$ are different depending on the types and operation states of the movable body 3 connected to the motor 2. Therefore, the motor 2 to which the movable body 3 is connected is actually driven by the motor control apparatus 1 to measure a torque waveform, and these parameters may be set based on the torque waveform and stored in the storage unit 12.

The acceleration calculation unit 13 calculates an acceleration command of the motor 2 for each moving direction of the movable body 3 and each acceleration operation and the deceleration operation of the rotor of the motor 2 according to any of formulae 9 to 12 using the allowable torque $T_{ML}(N(t))$, the first torque offset (friction torque) $T_1$, the second torque offset (gravity holding torque) $T_2$, the rotor inertia moment $J_m$, the load inertia moment $J_L$, and the conversion factor R. The allowable torque $T_{ML}(N(t))$ has a positive value, and the allowable torque $T_{ML}(N(t))$ used in the acceleration command calculation is used differently in the acceleration and in the deceleration of the movable body 3. In other words, when the movable body 3 is acceleratedly moved, a sign of an acceleration command $A_1(t)$ is set to match with a sign of the allowable torque $T_{ML}(N(t))$, and when the movable body 3 is deceleratedly moved, the sign of the acceleration command $A_1(t)$ is set opposite to the sign of the allowable torque $T_{ML}(N(t))$.

The acceleration command $A_1(t)$ calculated by the acceleration calculation unit 13 is input to the speed command unit 21. The speed command unit 21 generates a speed command by integrating the acceleration command $A_1(t)$. The speed command unit 21 may generate a position command by further integrating the speed command if necessary.

Next, the acceleration calculation processing by the acceleration calculation unit 13 is described in detail below.

When the movable body 3 is acceleratedly moved in the first direction (i.e., the direction against the gravity), the sign of the acceleration command $A_1(t)$ matches with the sign of the allowable torque $T_{ML}(N(t))$, and the directions of the first torque offset (friction torque) $T_1$ and the second torque offset (gravity holding torque) $T_2$ are opposite to the direction of the allowable torque $T_{ML}(N(t))$, so that the acceleration calculation unit 13 calculates the acceleration command $A_1(t)$ of the movable body 3 during acceleration movement in the first direction based on the formula 9.

$$A_1(t)=\{T_{ML}(N(t))-T_1-T_2\}\div(J_m+J_L)\times R \quad (9)$$

When the movable body 3 is deceleratedly moved in the first direction (i.e., the direction against the gravity), the sign of the acceleration command $A_1(t)$ is opposite to the sign of the allowable torque $T_{ML}(N(t))$, and the directions of the first torque offset (friction torque) $T_1$ and the second torque offset (gravity holding torque) $T_2$ are opposite to the direction of the allowable torque $T_{ML}(N(t))$, so that the acceleration calculation unit 13 calculates the acceleration command $A_1(t)$ of the movable body 3 during deceleration movement in the first direction based on a formula 10.

$$A_1(t)=\{-T_{ML}(N(t))-T_1-T_2\}\div(J_m+J_L)\times R \quad (10)$$

When the movable body 3 is acceleratedly moved in the second direction (i.e., a direction to which the gravity acts) opposite to the first direction, the sign of the acceleration command $A_1(t)$ matches with the sign of the allowable torque $T_{ML}(N(t))$, and the direction of the first torque offset (friction torque) $T_1$ is opposite to the direction of the allowable torque $T_{ML}(N(t))$, while the direction of the second torque offset (gravity holding torque) $T_2$ is the same as the direction of the allowable torque $T_{ML}(N(t))$, so that the acceleration calculation unit 13 calculates the acceleration command $A_1(t)$ of the movable body 3 during acceleration movement in the second direction opposite to the first direction based on a formula 11.

$$A_1(t)=\{T_{ML}(N(t))-T_1+T_2\}\div(J_m+J_L)\times R \quad (11)$$

When the movable body 3 is deceleratedly moved in the second direction (i.e., the direction to which the gravity acts) opposite to the first direction, the sign of the acceleration command $A_1(t)$ is opposite to the sign of the allowable torque $T_{ML}(N(t))$, and the direction of the first torque offset (friction torque) $T_1$ is opposite to the direction of the allowable torque $T_{ML}(N(t))$, while the direction of the second torque offset (gravity holding torque) $T_2$ is the same as the direction of the allowable torque $T_{ML}(N(t))$, so that the acceleration calculation unit 13 calculates the acceleration command $A_1(t)$ of the movable body 3 during deceleration movement in the second direction opposite to the first direction based on the formula 12.

$$A_1(t)=\{-T_{ML}(N(t))-T_1+T_2\}\div(J_m+J_L)\times R \quad (12)$$

Figure 3:
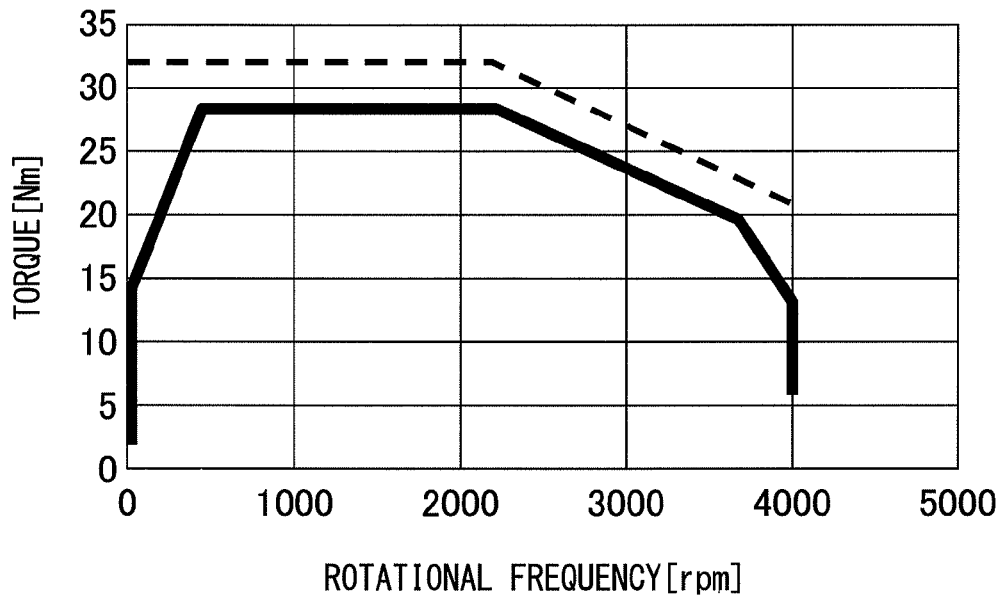
FIG. 3 is a graph illustrating a relationship between motor rotational frequency and allowable torque in FIG. 2.

Next, simulated waveforms of the motor control apparatus according to the embodiment are described with reference to FIG. 2 to FIG. 4. In the present simulation, the rotor inertia moment $J_m$ is given as 0.00179 [kgm$^2$]. FIG. 2 is the diagram indicating the allowable torque used for the simulation regarding the motor control apparatus according to the embodiment. The rotor inertia moment $J_m$ and the allowable torque $T_{ML}(N(t))$ are stored in the storage unit 12 in advance. FIG. 3 is the graph illustrating the relationship between motor rotational frequency and allowable torque in FIG. 2. In FIG. 3, a dotted-line indicates the allowable torque $T_{ML}(N(t))$ in FIG. 2, and a solid-line indicates the torque that the motor can output.

In addition, the load inertia moment $J_L$ is given as 0.00537 [kgm$^2$], the first torque offset (friction torque) $T_1$ is given as 2 [Nm], the second torque offset (gravity holding torque) $T_2$ is given as 4 [Nm], and the rotation-to-linear conversion factor R is given as 0.00318 [m/rad] (=0.02/2π). The parameters are stored in the storage unit 12. Parameters other than the above-described parameters are the same as those in the simulation described with reference to FIG. 12A, FIG. 12B, and FIG. 13 to FIG. 16.

Figure 4:
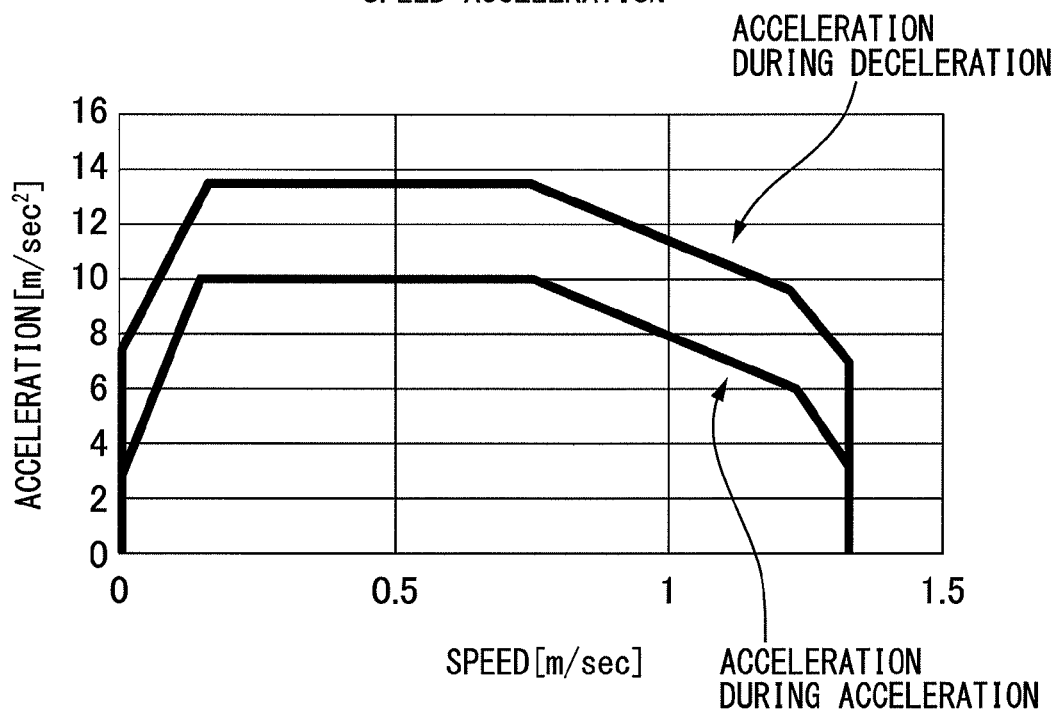
FIG. 4 is a graph illustrating a relationship between speed and acceleration obtained by the simulation regarding the motor control apparatus according to the embodiment.
Figure 5:
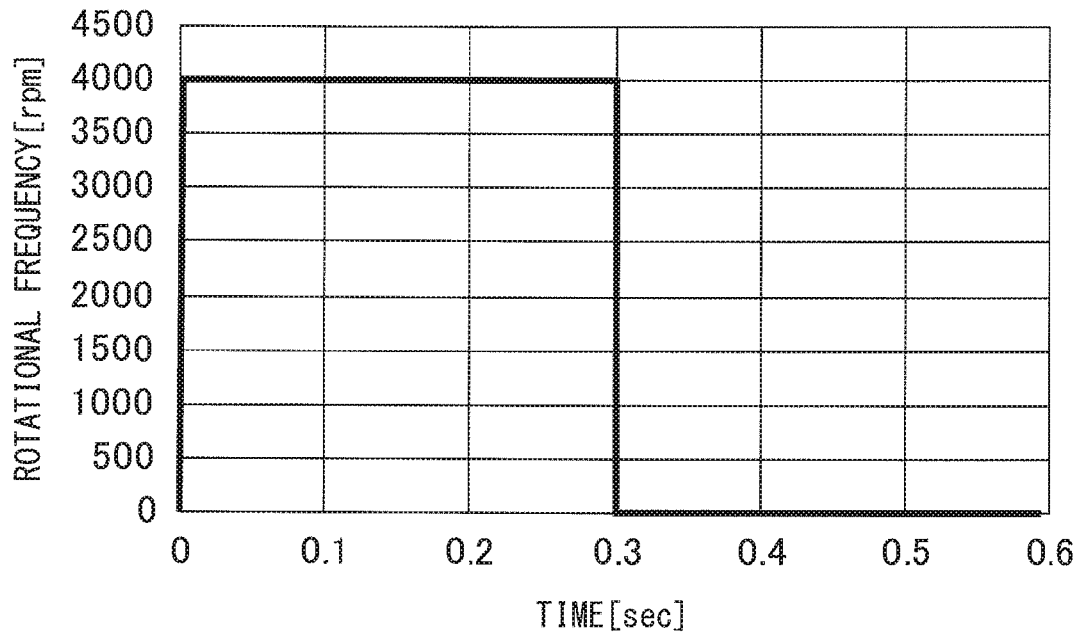
FIG. 5 illustrates a speed command before executing the two-stage moving average-type acceleration and deceleration processing.
Figure 6:
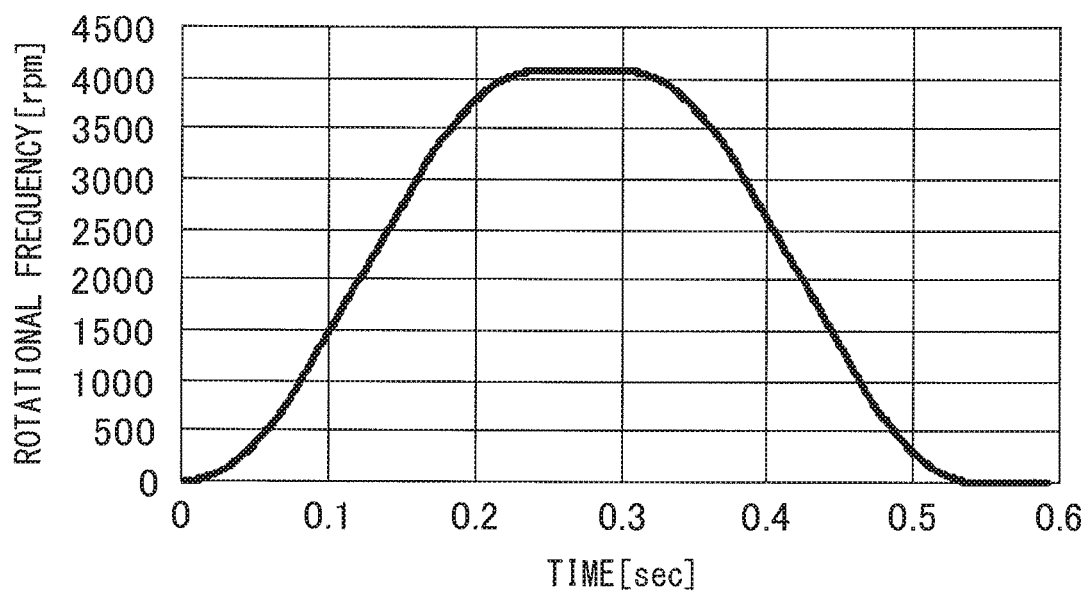
FIG. 6 illustrates the speed command when the two-stage moving average-type acceleration and deceleration processing is executed to the speed command in FIG. 5.
Figure 7:
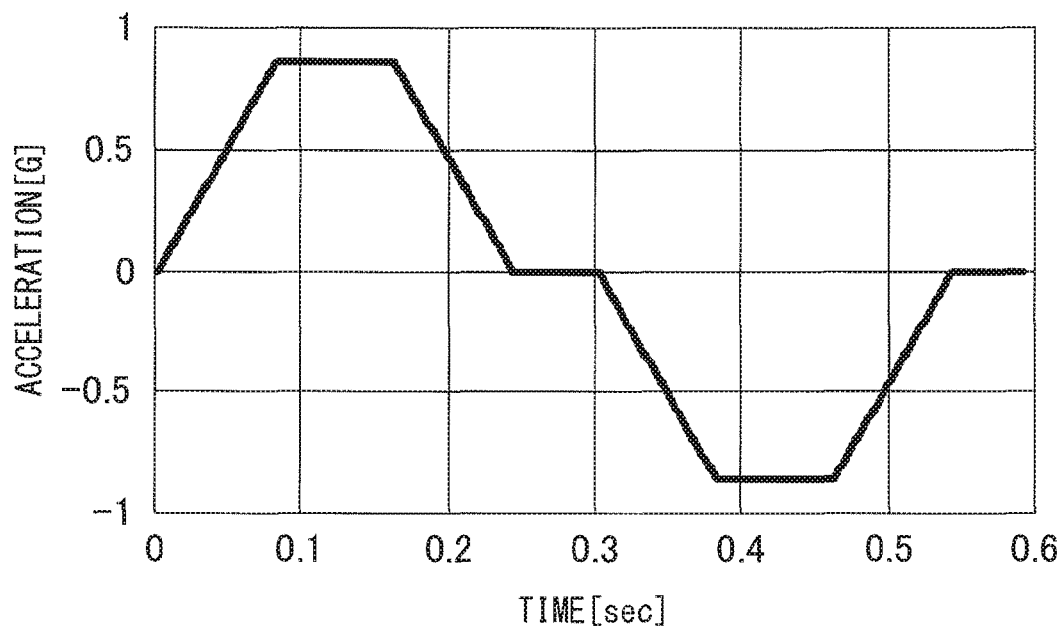
FIG. 7 illustrates acceleration of a movable body when the speed command after the two-stage moving average-type acceleration and deceleration processing in FIG. 6 is given.
Figure 8:
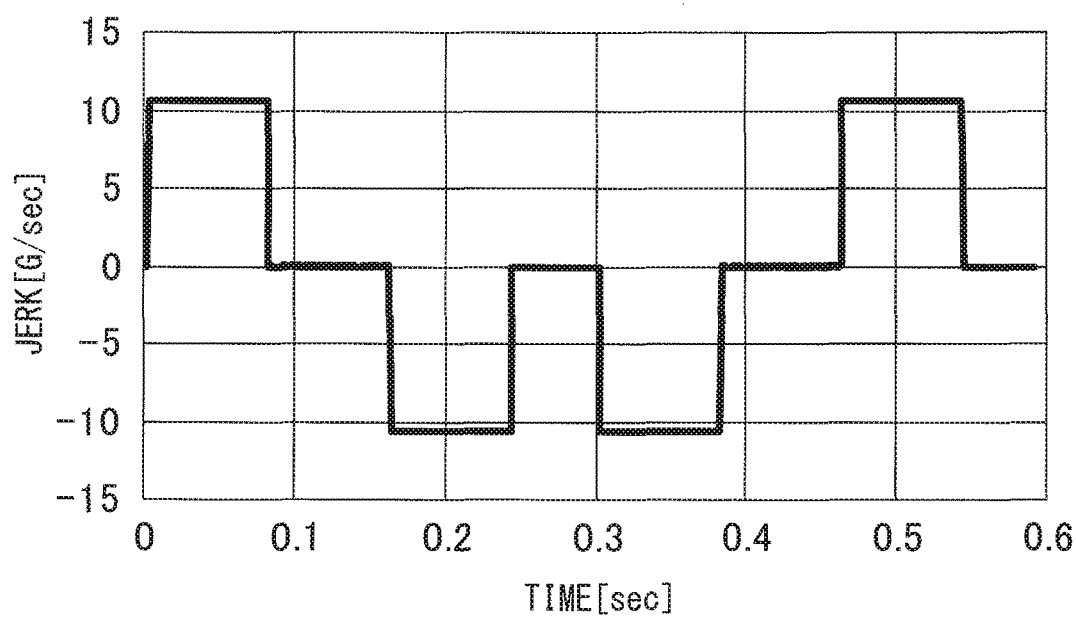
FIG. 8 illustrates jerk with respect to the acceleration of the movable body in FIG. 7.
Figure 9:
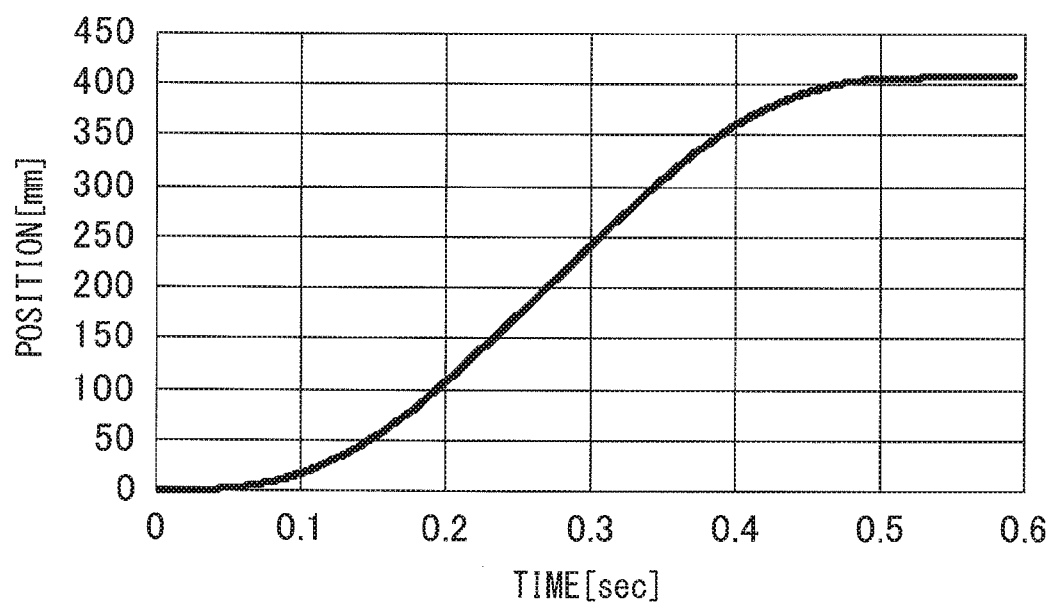
FIG. 9 illustrates a position of the movable body when the speed command after the two-stage moving average-type acceleration and deceleration processing in FIG. 6 is given.
Figure 10:
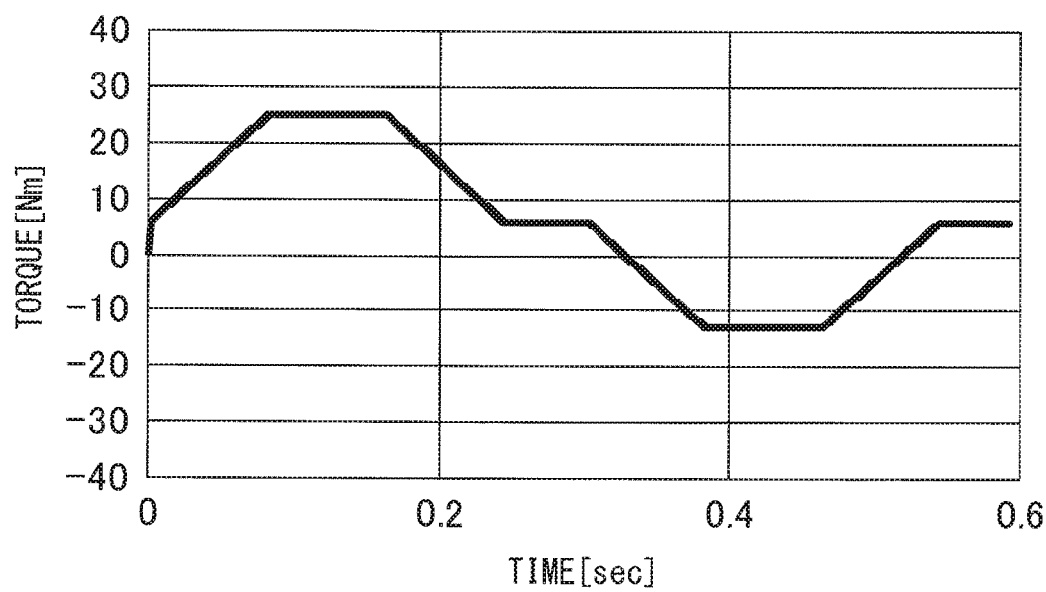
FIG. 10 illustrates a generation torque when the speed command after the two-stage moving average-type acceleration and deceleration processing in FIG. 6 is given.
Figure 11:
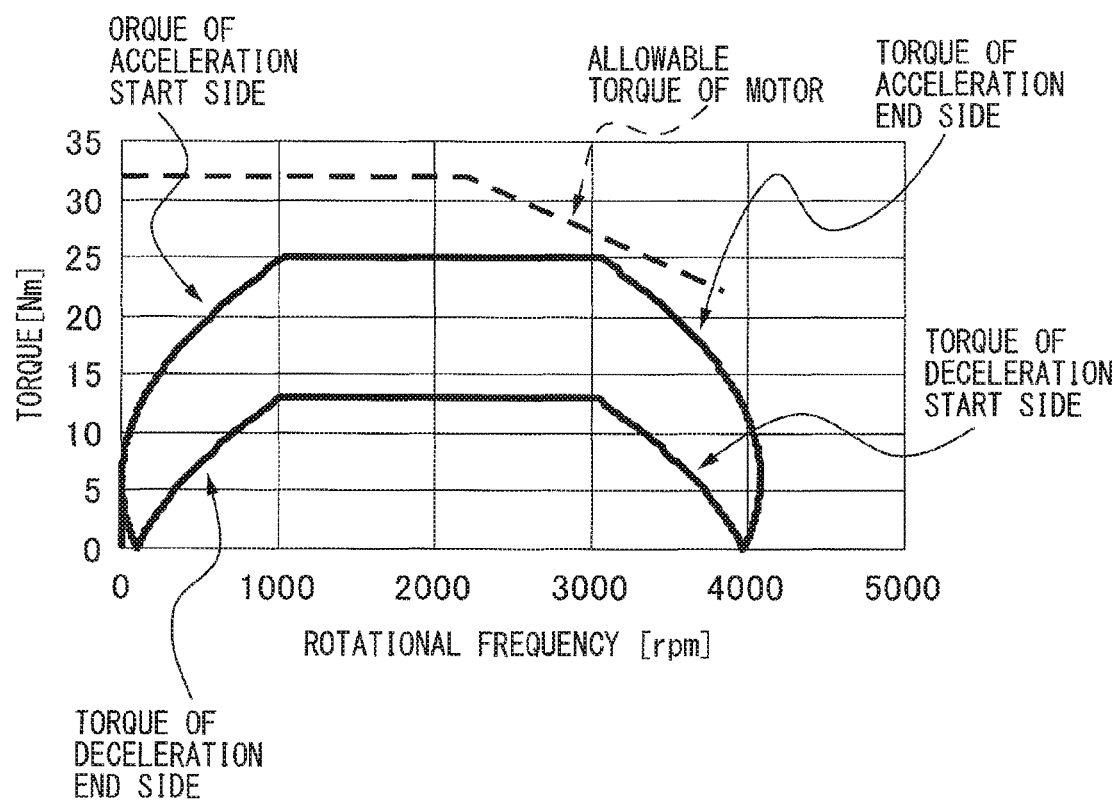
FIG. 11 illustrates a relationship between rotational frequency and torque when the speed command after the two-stage moving average-type acceleration and deceleration processing in FIG. 6 is given.
Figure 13:
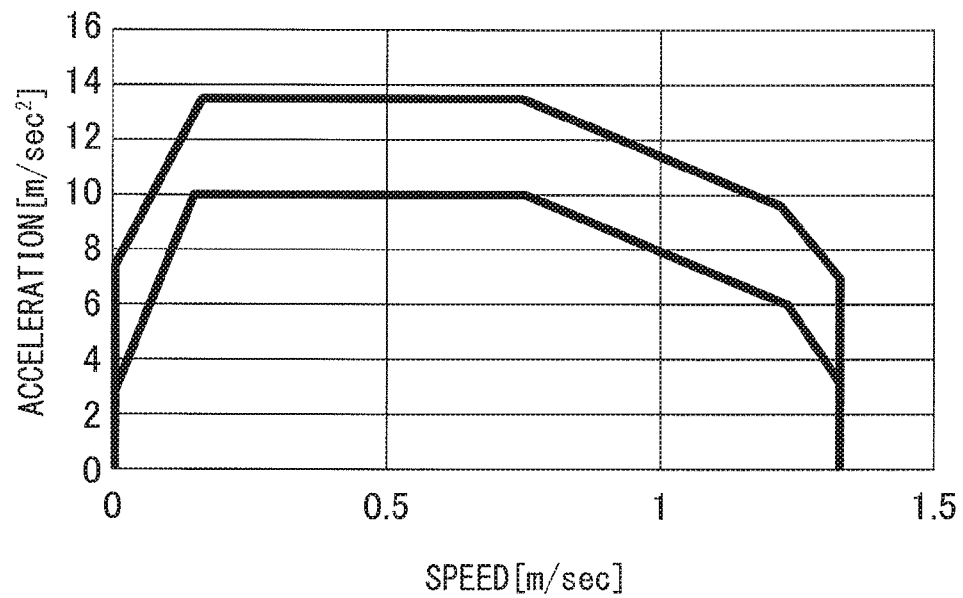
FIG. 13 is a graph illustrating the relationships between speed and acceleration in FIG. 12A and FIG. 12B.
Figure 14:
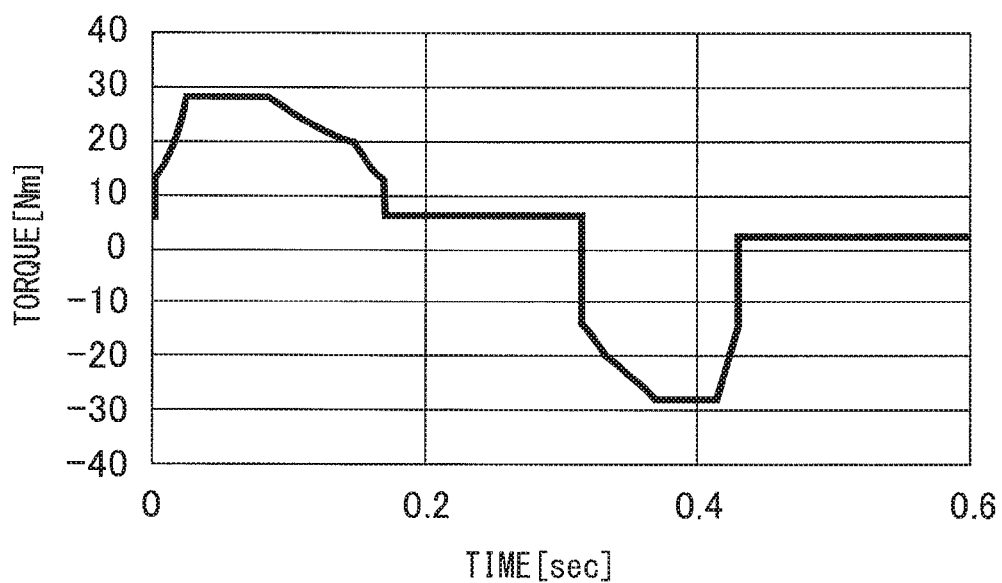
FIG. 14 illustrates a generation torque when the movable body is moved while maintaining the relationship between speed and acceleration in FIG. 12A, FIG. 12B, and FIG. 13.
Figure 15:
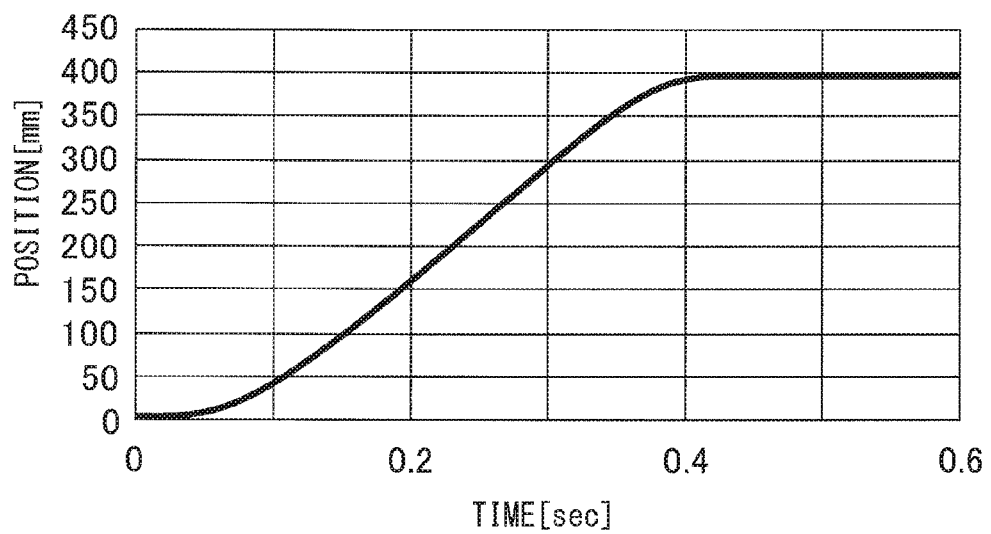
FIG. 15 illustrates a position of the movable body when the movable body is moved while maintaining the relationship between speed and acceleration in FIG. 12A, FIG. 12B, and FIG. 13.
Figure 16:
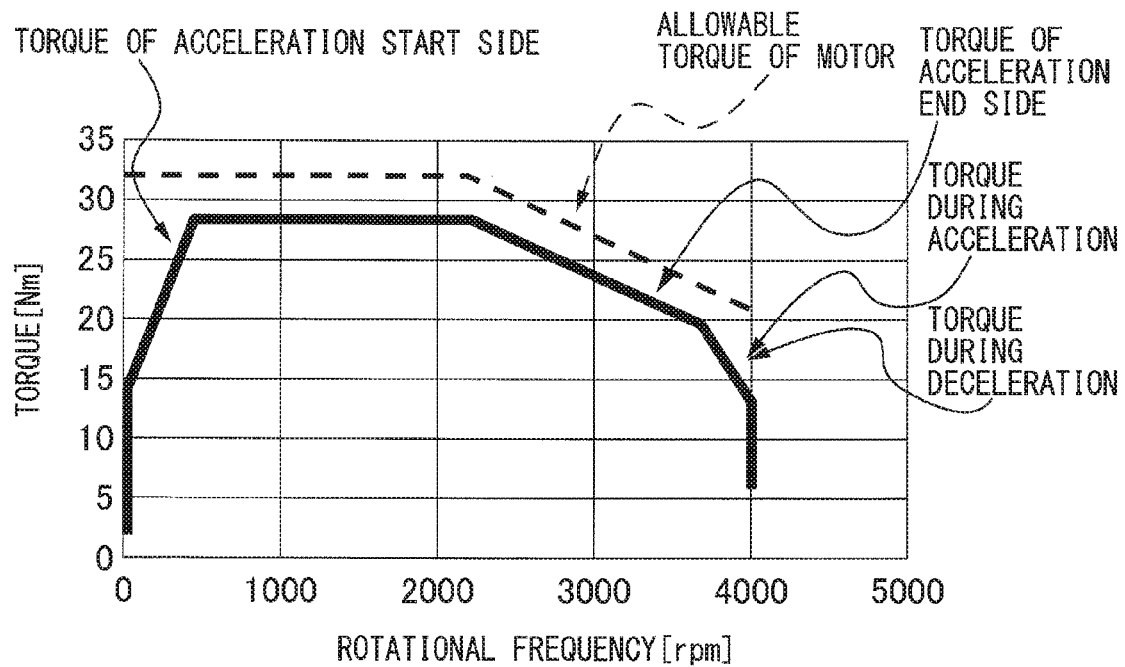
FIG. 16 illustrates a relationship between rotational frequency and torque when the movable body is moved while maintaining the relationship between speed and acceleration in FIG. 12A, FIG. 12B, and FIG. 13.

FIG. 4 is the graph illustrating the relationship between speed and acceleration obtained by the simulation regarding the motor control apparatus according to the embodiment. The acceleration calculation unit 13 calculates acceleration according to the formulae 9 to 12 and further integrates the obtained acceleration, so that the relationship between speed and acceleration as illustrated in FIG. 4 can be obtained. The acceleration command and the acceleration response basically matches with each other, and thus they are simply described as "acceleration" here for a concise description. When the relationship between speed and acceleration according to the embodiment in FIG. 4 is compared with the relationship between speed and acceleration according to the invention described in Japanese Patent No. 3681972 in FIG. 13, it is understood that the present invention can obtain a speed-acceleration characteristic similar to that of the invention described in Japanese Patent No. 3681972. As described above, the allowable torque $T_{ML}(N(t))$ and the rotor inertia moment $J_m$ are specific to the motor 2 driven by the motor control apparatus 1 and are generally specified in advance in the specification of the motor 2 or the like. Further, the first torque offset (friction torque) $T_1$, the second torque offset (gravity holding torque) $T_2$, and the load inertia moment $J_L$ are different depending on the types and the operation states of the movable body 3 connected to the motor 2. Therefore, the motor 2 to which the movable body 3 is connected is actually driven by the motor control apparatus 1 to measure a torque waveform, and these parameters are set based on the torque waveform. The parameters are only set as described above, and the speed-acceleration characteristic similar to that of the invention described in Japanese Patent No. 3681972 can be obtained.

According to the above-described embodiment, it is assumed that the movable body 3, which is a table, linearly moves in the vertical direction. Thus, the gravity constantly acts in one direction (i.e., the downward direction) on the movable body 3 linearly moved in the vertical direction, and the first torque offset $T_1$ is regarded as the friction torque of the movable body linearly moved by the motor 2, and the second torque offset $T_2$ is regarded as the gravity holding torque for holding the gravity received by the movable body 3. As a modification of the embodiment, the present invention can be applied to a case when the movable body 3 is linearly moved in a horizontal direction and a force constantly acts on the movable body 3 in one direction in the horizontal direction. In the modification, the second torque offset $T_2$ may be set as a torque caused by a force toward one direction in the horizontal direction.

The above-described acceleration calculation unit 13 and speed command unit 21 may be constructed as, for example, a software program format or a combination of various electronic circuits and software programs. For example, when these units are constructed in the software program format, an arithmetic operation apparatus in the motor control apparatus 1 operates according to the software program, and each function of the above-described units can be realized. In addition, the present invention can be applied to an existing motor control apparatus by additionally installing the software program regarding these units to the arithmetic operation apparatus in the motor control apparatus.

What is claimed is:

1. A motor control apparatus controlling a motor connected to a movable body as a driving source to linearly move the movable body, the control apparatus comprising:
    a detection unit configured to detect a motor rotational frequency;
    a storage unit configured to store an allowable torque which is a maximum torque that the motor can output at the motor rotational frequency detected by the detection unit, a first torque offset which is a torque generated in a direction opposite to a moving direction of the movable body, a second torque offset which is a torque generated in one direction regardless of the moving direction of the movable body, a rotor inertia moment of the motor, a load inertia moment, and a conversion factor for converting a motor rotation angle in rotary motion of the motor to a moving distance in linear motion of the movable body; and
    an acceleration calculation unit configured to calculate an acceleration command of the motor for each moving direction of the movable body and each acceleration operation and deceleration operation of a rotor of the motor using the allowable torque, the first torque offset, the second torque offset, the rotor inertia moment, the load inertia moment, and the conversion factor.

2. The motor control apparatus according to claim 1 wherein, when the motor rotational frequency at a time t is given as N(t), the allowable torque is given as $T_{ML}(N(t))$, the first torque offset is given as $T_1$, the second torque offset is given as $T_2$, the rotor inertia moment is given as $J_m$, the load inertia moment is given as $J_L$, and the conversion factor is given as R, the acceleration calculation unit calculates
    the acceleration command $A_1(t)$ of the movable body being acceleratedly moved in a first direction based on a following formula,
    $$A_1(t)=\{T_{ML}(N(t))-T_1-T_2\}\div(J_m+J_L)\times R$$
    the acceleration command $A_1(t)$ of the movable body being deceleratedly moved in the first direction based on a following formula,
    $$A_1(t)=\{-T_{ML}(N(t))-T_1-T_2\}\div(J_m+J_L)\times R$$
    the acceleration command $A_1(t)$ of the movable body being acceleratedly moved in a second direction opposite to the first direction based on a following formula,
    $$A_1(t)=\{T_{ML}(N(t))-T_1+T_2\}\div(J_m+J_L)\times R$$
    and the acceleration command $A_1(t)$ of the movable body being deceleratedly moved in the second direction based on a following formula,
    $$A_1(t)=\{-T_{ML}(N(t))-T_1+T_2\}\div(J_m+J_L)\times R$$

3. The motor control apparatus according to claim 1, wherein the first torque offset is a friction torque of the movable body linearly moved by the motor, and the second torque offset is a gravity holding torque which is a torque for holding gravity received by the movable body.

4. The motor control apparatus according to claim 1, wherein the first torque offset, the second torque offset, and the load inertia moment are set based on a torque waveform obtained when the movable body is linearly moved by the motor.

5. The motor control apparatus according to claim 1, wherein the allowable torque is respectively set for acceleration of the movable body and for deceleration of the movable body.

* * * * *